United States Patent Office 2,765,491
Patented Oct. 9, 1956

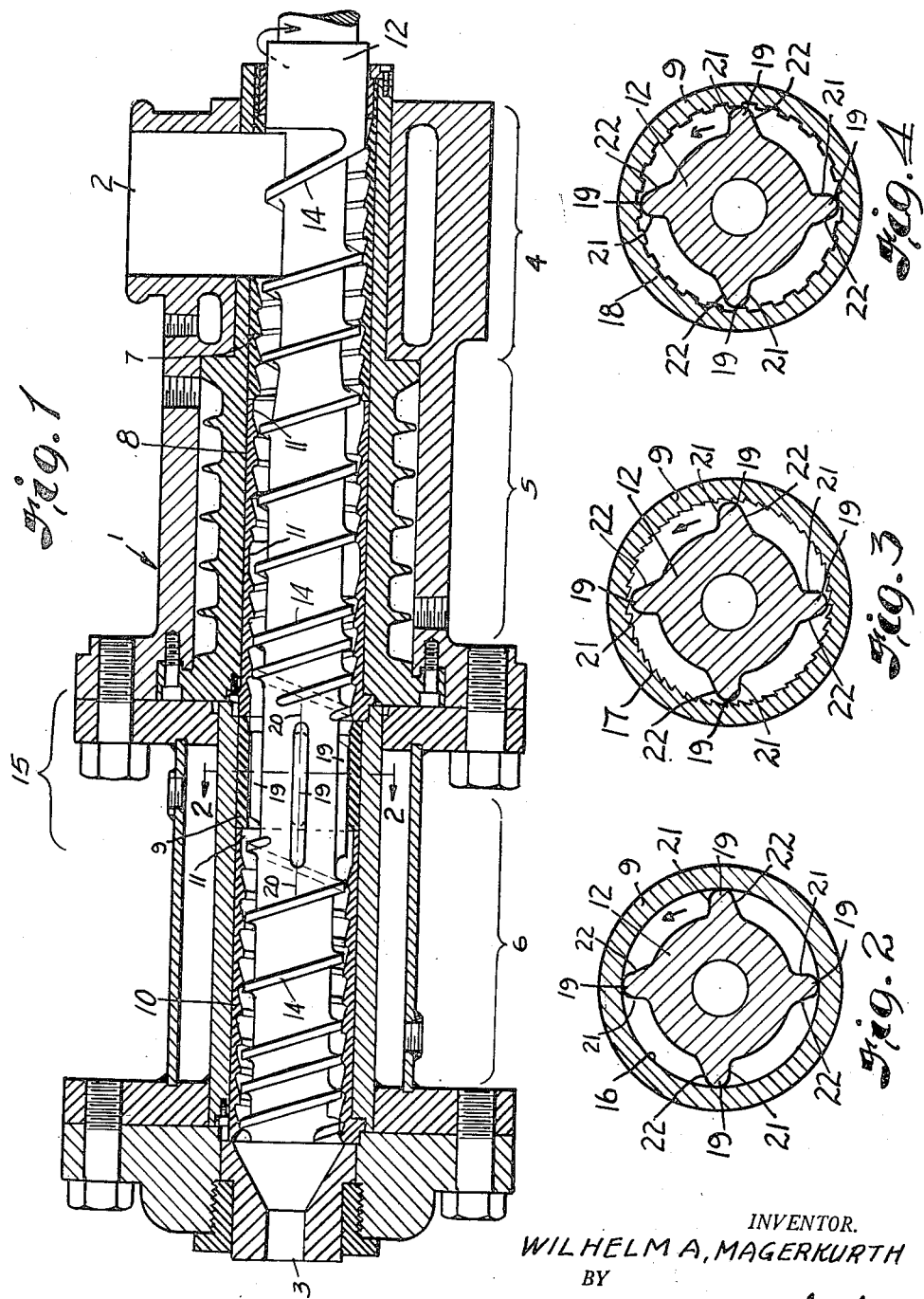

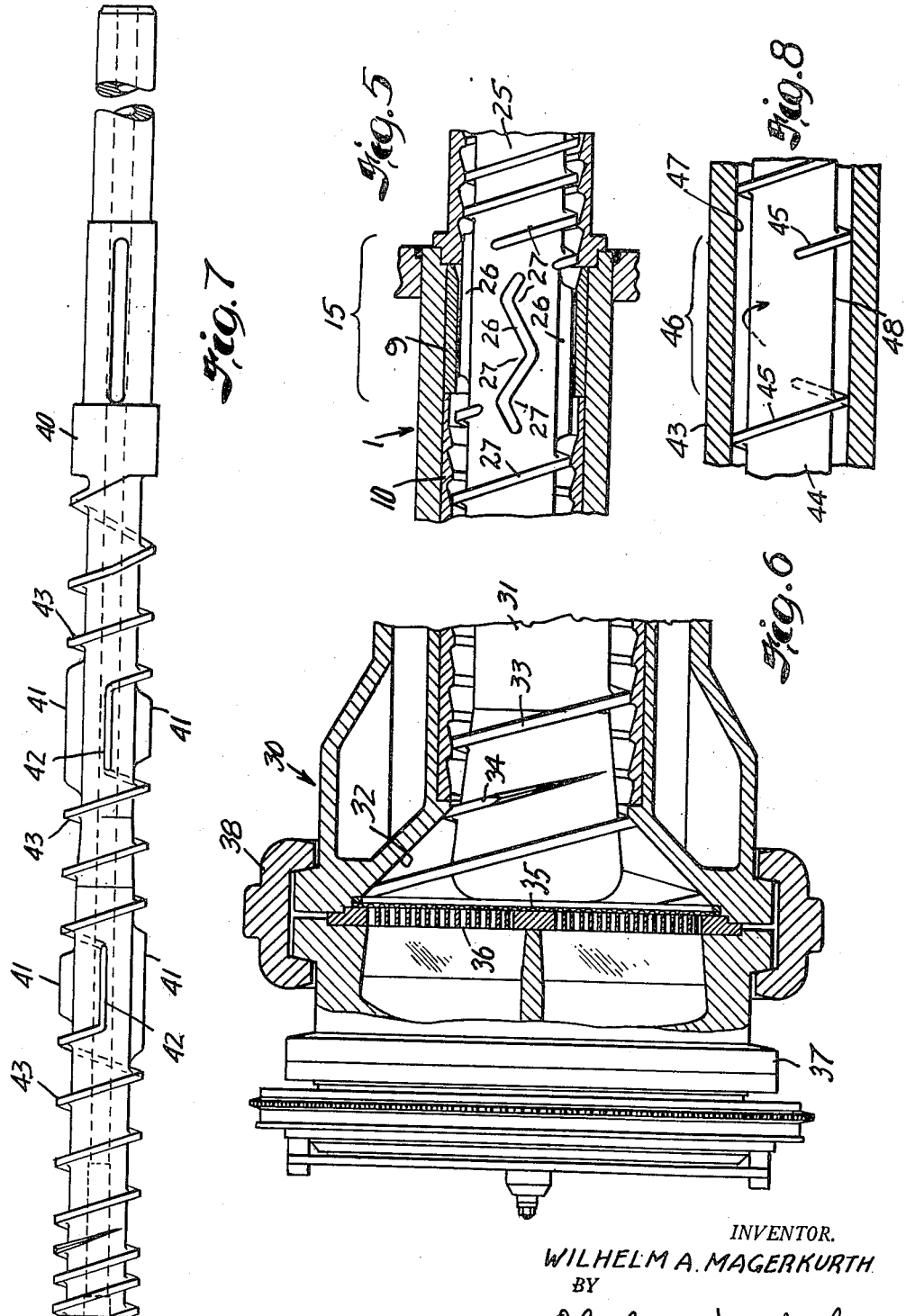

2,765,491

EXTRUSION APPARATUS

Wilhelm A. Magerkurth, Akron, Ohio, assignor to National Rubber Machinery Company, a corporation of Ohio Application May 4, 1953, Serial No. 352,830

8 Claims. (Cl. 18—12)

The present invention relates generally as indicated to an extrusion apparatus, especially one of the screw type, wherein an extrusion cylinder has a rotary feed screw therein which works and heats the plasticizable material therearound and advances the same longitudinally through the cylinder from one end toward the other for discharge through a die or the like. In a broader sense, the present invention relates simply to a mixing apparatus into which different materials as, for example, rubber particles, oils, and chemicals, may be introduced for discharge in the form of a thoroughly mixed mass which has been subjected during the course of its advance through the apparatus, not only to mixing action, but additionally to kneading, milling, blending, and tumbling action while preferably not subjected to severe crushing, shearing, or masticating action.

It is an object of this invention to provide an extrusion or mixing apparatus of the character indicated above which has therein a so-called "mixing zone" through which the body of material being worked upon is advanced by the feed screw and there mixed, kneaded, milled, tumbled, and blended by means of one or more special formations on the feed screw in said "mixing zone."

Another object of this invention is to provide apparatus of the character indicated wherein the mixing components in said mixing zone induce turning of the body of material and are disposed parallel to or approximately parallel to the direction of advance of the material through the apparatus to thereby reduce resistance to advance of the material and consequently increase the productive capacity of the apparatus.

Another object of this invention is to provide an apparatus of the character indicated in which the size of the particles which pass out of the mixing zone are controlled.

Another object of this invention is to provide an apparatus of the character indicated in which the helical flight of the feed screw is interrupted in the mixing zone, whereby material is fed into the mixing zone by the adjacent flight portion of the feed screw and similarly the thoroughly mixed material is withdrawn from the mixing zone by the other adjacent flight portion of the feed screw.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a longitudinal cross-section view of one form of the present apparatus;

Fig. 2 is a transverse cross-section view taken substantially along the line 2—2, Fig. 1;

Figs. 3 and 4 are transverse cross-section views similar to Fig. 2 except illustrating modifications;

Fig. 5 is a fragmentary longitudinal cross-section view illustrating a modification;

Fig. 6 is a longitudinal cross-section view of the discharge end of an apparatus having a flared end feed screw;

Fig. 7 is an elevation view of a feed screw having a plurality of mixing sections longitudinally spaced therealong; and Fig. 8 is a fragmentary longitudinal cross-section view illustrating a modification.

Broadly stated, the present apparatus comprises an extruder or mixer which has at least one mixing zone between the ends thereof whereat the helical feeding flight of the feed screw is interrupted and whereat the body of material is subjected to mixing and other actions aforesaid by means of one or more ribs or lugs on said feed screw which extend in a direction generally parallel to the direction of advance of the material, at least one of said ribs or lugs being disconnected and spaced from the adjacent flight portions.

Referring now more particularly to the drawings and first to Fig. 1 thereof, the reference numeral 1 designates a cylinder assembly as a whole which, in the case of an extruder for thermoplastic material or the like and also in the case of a mixer, is provided with a feed hopper 2 adjacent one end and a die 3 at the other end, said assembly preferably being divided into several temperature regulating zones 4, 5, and 6 for circulation of temperature modifying medium. The zone 4 in the case of an extruder is usually a cooling zone to prevent sticking of the material in or near the feed hopper 2 and the zones 5 and 6 are usually heating zones which, after the apparatus has been warmed up and has been in operation a short time, may be converted to cooling zones to carry away excess heat which might be generated by the compression and mechanical working of the material as it is being advanced through the cylinder assembly 1 and to rapidly dissipate heat to prevent overheating of the material when the apparatus is shut off.

The cylinder assembly 1 is provided with a liner therein which is shown as comprising several adjacent sections 7, 8, 9, and 10, and it will be apparent that, except for difficulty of manufacture, said liner could be made in one piece or in fewer than the four pieces 7, 8, 9, and 10 shown; and also that, except for the desirability of making said liner from a hard wear-resisting alloy and the impracticability of making the entire cylinder assembly 1 from any such relatively expensive material, said liner could be integral with the cylinder assembly.

The sections 7, 8, and 10 of said liner are preferably formed with internal threads as shown, and also with one or more under-cuts or unthreaded recesses 11 to co-operate with the feed screw 12 in the manner clearly shown and described in my co-pending application, Serial No. 136,635, filed January 3, 1950, now Patent No. 2,639,464, dated May 26, 1953. It is to be noted that section 10 of the liner and also the portion of section 8 between the under-cuts 11 are formed with threads of the same hand as the helical feeding flight 14 of the feed screw 12 to thus serve to establish a counter-flow of the material. The section 7 and the left-hand portion of section 8 have threads of the opposite hand so as to assist the flight 14 in advancing the material into the under-cut 11 nearest feed hopper 2 and then out of the next under-cut 11.

The mixing zone 15 to which this invention particularly relates is that portion of the cylinder assembly 1 which is disposed within the liner section 9 which section, as shown in Figs. 2, 3, and 4, may have a smooth bore 16 therethrough as in Fig. 2, or a fluted bore of saw tooth form 17 as in Fig. 3, or of spline form 18 as in Fig. 4. The flutes in Figs. 3 and 4 preferably extend axially or approximately axially of said liner section 9 so as to effectively resist rotation of the body of the material in the cylinder assembly 1 without opposing the generally axial advance of the material toward the die 3.

Rotatable in the cylinder assembly 1 is the feed screw 12 aforesaid which usually is of hollow construction to enable circulation of coolant therethrough for reducing the tendency of sticking of the material therearound. In this way, the screw 12 will rotate relative to the body of the material therearound so that the flight 14 will advance the material from the feed hopper 2 toward the die 3. The direction of rotation of said feed screw is shown by the arrows in Figs. 1 to 4.

As best shown in Fig. 1, the flight 14 is interrupted in said mixing zone 15 and in its place is substituted at least one, but usually several, such as four, axially or approximately axially extending ribs or paddles 19. As shown, four such ribs 19 are herein provided having their ends spaced from the adjacent flight portions 14. At least one of said ribs 19 should have its ends thus disconnected and spaced from the adjacent flight portions 14, because the spaces 20 thus created provide for positive mixing and interruption in the flow of the material, and also prevent passing of the material through the mixing zone 15 without thorough mixing. These spaces 20 are of further importance in that they regulate the size of the particles of the material which are permitted to pass into and out of the mixing zone 15. The mixing ribs 19 are of varying length and, of course, the longer ribs provide for greater mixing; and it has not been found necessary to have all of said ribs of the long length.

The axial or nearly axial disposition of said mixing ribs 19 permits unrestricted advance of the material through the mixing zone 15 under the influence of the adjacent flight portions 14 in the same manner that the fluted bores 17 or 18 in the liner section 9 permit unrestricted axial travel of the material through the mixing zone 15. Preferably the cross-section area between the shank of the feed screw 12 and the bore 16, 17, or 18 of the liner section 9 is at least as large as the cross-section area between the screw shank and the adjacent liner sections 8 and 10. In fact, the screw shank is preferably of substantially the same diameter on opposite sides of the mixing zone 15 as in the mixing zone. Actually, it has been found desirable to have a radial clearance space between the outside diameter of the mixing ribs 19 and the smallest diameter of the liner section 9, such radial clearance in the case of a 10" diameter feed screw being .03", for example.

The mixing ribs 19 are preferably of cross-section shape, as shown in Figs. 2, 3, and 4, with substantially radially extending and concave leading surfaces 21 and with sloped, trailing surfaces 22.

The radial clearance aforesaid between the ribs 19 and the liner section bore 16, 17, or 18 causes rolling or kneading of the material without severe crushing, shearing, or masticating.

In the apparatus illustrated in Fig. 5, the feed screw 25 has mixing ribs 26 of zig-zag form, of which at least one is disconnected from the adjacent flight portions 27 of the feed screw. This zig-zag form of mixing rib 26 is sometimes advantageous in that it forms retaining pockets 27 for the material which is turned in the mixing zone 15. Thus, the pockets 27 tend to spread apart and promote mixing of successive sections of the body of the material being mixed.

Fig. 6 shows a cylinder assembly 30 for a flared end feed screw 31, which fits into the correspondingly flared mouth 32. The material advanced by the flights 33 and 34 of course has been subjected to thorough mixing in a preceding mixing zone or zones 15 of the apparatus, and any unplasticized material as well as foreign matter is held back against discharge by the screen 35 and the perforated strainer or breaker plate 36, said screen and plate being clamped between cylinder 30 and an extrusion head 37 as by means of clamp 38. The provision of such enlarged delivery end increases the volumetric output and the strainer holds back unplasticized material and foreign matter and also serves to build up some back pressure to promote frictional heating, mixing, and smearing of the material.

Fig. 7 illustrates a feed screw 40 which, at two longitudinally spaced sections thereof, is provided with mixing ribs 41 and 42 for co-operation with a corresponding number of surrounding liner sections 9 of any of the types disclosed in Figs. 2, 3, and 4. Obviously, more mixing sections may be provided on said screw 40, if desired. In the particular form shown in Fig. 7, two of the mixing ribs 41 in each section are disconnected at opposite ends from the adjacent flight portions 43 and the other two mixing ribs 42 in each section are connected at one end to the adjacent flight portion 43 and disconnected at the other end from the adjacent flight portion 43.

When this apparatus is used as a mixer, particles or granules of devulcanized rubber of, for example, $\frac{1}{8}$" to $\frac{1}{4}$" size, oils, and chemicals (in liquid or finely divided powder or pellet form) are fed from the feed hopper 2 toward the discharge end of the cylinder assembly 1, and in so doing the particles are compacted and subjected to mixing action in the under-cuts 11 where the latter are provided and then to a final thorough mixing in the one or more mixing zones 15 provided along the length of the feed screw 12 and cylinder assembly 1. A well mixed rubber compound is thereby continuously discharged from the apparatus at a relatively high rate of production. Proof of the thorough mixing was the lumpy and bound condition of the material as discharged from the apparatus. The mixing ribs 19, or 26, or 41 and 42, act to turn the material engaged by the leading surfaces of said ribs to knead, mix, mill, blend, and tumble the material without severe crushing, shearing, or masticating, and of course such action is increased by having a liner section 9 with a fluted bore. A shearing of the material occurs along the threaded portions of the feed screw, but in the mixing zone 15 the action desired and obtained with this apparatus is a tumbling, mixing action. The flight portion of the feed screw forward of the mixing zone 15 withdraws material from the mixing zone and discharges it at the die or delivery end of the cylinder assembly. However, the size of the particles entering such advance flight portion is determined by the size of the space 20 between said flight portion and the ends of the mixing ribs. The material to be mixed may be introduced into hopper 2 in strip, pellet, granular, chip, or other form. The materials frequently mixed in this apparatus are rubber reclaims, but obviously rubber-like materials and organic plastic materials may be mixed.

Referring now to Fig. 8, there is shown therein a cylinder 43 in which a feed screw 44 is rotatable, said feed screw being provided with a helical feeding rib or flight 45 therearound which advances the material from right to left when said feed screw is rotated in the direction of the arrow. Said flight 45 is interrupted between its ends, as shown, so as to form a mixing zone 46 whereat the material expands and is rolled around between the cylinder bore 47 and the exterior surface of the hub 48 of said feed screw 44. Obviously, either or both of the surfaces 47 and 48 in said mixing zone 46 may be provided with longitudinally extending flutes or ribs to facilitate such rolling around and mixing of the material; and furthermore, the bore 47 may be internally threaded in said mixing zone 46 and thereadjacent. The absence of the flight 45 in said mixing zone 46 renders the cross-section area greater than in the adjacent portions. Thus, said mixing zone 46 constitutes an expansion chamber into which the material is fed by the flight portion rearward thereof and from which the material is withdrawn by the flight portion forward thereof. In a sense, the Fig. 8 construction is a further modification of the construction illustrated in my co-pending application Serial No. 136,635 in that the mixing zone expansion chamber 46 herein is formed by the omission of or interruption of the flight on the feed screw, whereas in my said co-pending application, the said cylinder is provided with threadless-under-cuts to provide mixing zones or expansion chambers in which the material is subjected to mixing action.

Other modes of applying the principle of the invention may be employed, change being made as regards the details described, provided the features stated in any of the following claims, or the equivalent thereof, be employed.

I therefore particularly point out and distinctly claim as my invention:

1. In apparatus of the character described, the combination of a cylinder, and a feed screw rotatable in said cylinder and provided with a helical flight therearound for advancing material axially of said cylinder, said cylinder and feed screw, between the ends thereof, defining a mixing zone whereat said flight is interrupted and whereat said feed screw is provided with at least one rib which extends generally axially of said feed screw, which, with reference to the direction of rotation of said feed screw, has a generally radially disposed leading face, and which has its ends spaced from the adjacent flight portions to thus provide passages for flow of material into and from said mixing zone, said rib being disposed to turn the material in said zone while the adjacent flight portions are effective to feed and to withdraw material into and from said mixing zone.

2. The apparatus of claim 1 wherein the surrounding wall of said cylinder in said mixing zone is fluted to resist circumferential movement of the material and to thereby promote rolling and kneading of the material.

3. In apparatus of the character described, the combination of a cylinder, and a feed screw rotatable in said cylinder and provided with a helical flight therearound for advancing material axially of said cylinder, said cylinder and feed screw, between the ends thereof, defining a mixing zone whereat said flight is interrupted and whereat said feed screw is provided with a plurality of generally axially extending ribs at least one of which has its ends spaced from the adjacent flight portions to thus provide passages for flow of material into and from said mixing zone, said ribs, with reference to the direction of rotation of said feed screw, having generally radially disposed leading faces which are effective to turn the material in said zone while the adjacent flight portions are effective to feed and to withdraw material into and from said mixing zone.

4. The apparatus of claim 3 wherein said ribs are spaced from the surrounding wall of said cylinder to avoid severe shearing, crushing, or masticating action on the material thus turned in said mixing zone and to enable movement of material over said ribs for efficient mixing action.

5. In apparatus of the character described, the combination of a cylinder, and a feed screw rotatable in said cylinder and provided with a helical flight therearound for advancing material axially of said cylinder, said cylinder and feed screw, between the ends thereof, defining a mixing zone whereat said flight is interrupted and whereat said feed screw is provided with a plurality of ribs, each of which extends generally axially of said feed screw, which has a generally radial leading face, and which has its ends spaced from the adjacent flight portions to thus provide passages for flow of material into and from said mixing zone, said ribs being disposed to turn the material in said zone while the adjacent flight portions are effective to feed and to withdraw material into and from said mixing zone.

6. In apparatus of the character described, the combination of a cylinder, and a feed screw rotatable in said cylinder and provided with a helical flight therearound for advancing material axially of said cylinder, said cylinder and feed screw, between the ends thereof, defining a plurality of axially spaced-apart mixing zones in each of which said flight is interrupted and in each of which said feed screw is provided with at least one rib which extends generally axially of said feed screw, which has a generally radially disposed leading face, and which has its ends spaced from the adjacent flight portions to thus provide passages for flow of material into and from the respective mixing zones, each said rib being disposed to turn the material in the respective mixing zone while the adjacent flight portions are effective to feed and to withdraw material into and from said mixing zones.

7. In apparatus of the character described, the combination of a cylinder and a feed screw rotatable in said cylinder and provided with a helical flight therearound for advancing material axially of said cylinder, said cylinder and feed screw, between the ends thereof, defining a mixing zone whereat said flight is interrupted and whereat said feed screw is provided with a plurality of generally axially extending ribs, at least one of which has its ends spaced from the adjacent flight portions to thus provide passages for flow of material into and out from said mixing zones, and another of which has at least one of its ends connected to the adjacent flight portion, said ribs having generally radially disposed leading faces with reference to the direction of rotation of said feed screw to turn the material in said zone while the flight portions adjacent such passages are effective to feed and to withdraw material into and from said zone.

8. The apparatus of claim 1 wherein said cylinder is formed with an internal flight which is of the same hand as the flight portion of said feed screw therewithin and which is located to induce a counterflow in a portion of the material passing through said mixing zone.

References Cited in the file of this patent
UNITED STATES PATENTS

| | | |
|---|---|---|
| 1,904,884 | Royle | Apr. 18, 1933 |
| 2,319,859 | Hale | May 25, 1943 |
| 2,485,854 | Zona | Oct. 25, 1949 |
| 2,519,014 | Bankey | Aug. 15, 1950 |
| 2,595,455 | Heston | May 6, 1952 |
| 2,662,243 | Schnuck et al. | Dec. 15, 1953 |